United States Patent [19]
Morishita

[11] Patent Number: 4,919,079
[45] Date of Patent: Apr. 24, 1990

[54] METHOD FOR TRANSPORTING LIVE FISH
[75] Inventor: Tadao Morishita, Minamatashi, Japan
[73] Assignee: Morishita Technical Laboratory, Kumamotoken, Japan
[21] Appl. No.: 332,962
[22] Filed: Apr. 4, 1989
[30] Foreign Application Priority Data
Dec. 14, 1988 [JP] Japan .................. 63-315330
[51] Int. Cl.$^5$ ............................... A01K 61/00
[52] U.S. Cl. ............................ 119/3; 119/2
[58] Field of Search ............... 119/3, 2, 4, 5
[56] References Cited
U.S. PATENT DOCUMENTS

| 3,076,432 | 2/1963 | Jung et al. | 119/3 |
| 3,110,285 | 11/1963 | Greenough | 119/3 |
| 3,565,041 | 2/1971 | Brooks | 119/3 |
| 3,573,934 | 4/1971 | Mitchell | 119/3 |
| 3,996,893 | 12/1976 | Buss | 119/3 |
| 4,089,298 | 5/1978 | Wilson | 119/2 |
| 4,357,902 | 11/1982 | Sheldon et al. | 119/3 |
| 4,844,012 | 7/1989 | Jerrett | 119/3 |

Primary Examiner—Paul J. Hirsch
Attorney, Agent, or Firm—Fred Philpitt

[57] ABSTRACT

Vegetable humus which is a botanical fermented product which has been accumulated and deposited in water of sea or lake-bottom for a long period of time is useful in improvement of efficiency of transportation of live fish by using a transportation tank. Vegetable humus containing 50 to 80% by weight of water is ground, and activated with air, activated powder or water extract of the activated powder is added into the transportation tank.

2 Claims, No Drawings

METHOD FOR TRANSPORTING LIVE FISH

BACKGROUND OF THE INVENTION

1. Field of the invention

This invention relates to improving the efficiency of transportation of live fish utilizing vegetable humus that has been subjected to activation treatment.

Vegetable humus (or humus soil) referred to herein is botanical fermented product which was accumulated and deposited for a long period of time in water at the bottom of a sea or lake.

2. Prior Art

The inventor of the present application filed in Japan a patent application for an invention relating to adsorbing, deodorizing and sterilizing a composition obtained by oxidizing vegetable humus with air and drying the product. This application was published (as Japanese patent publication Sho 62-1362) and registered (as a patent No. 1,393,474). Various applications of this composition are now being developed. The form of the compositions are diverse, for example, they are powder, aqueous extracted solutions granules, etc., depending upon the application field. Hereinafter powder will be referred to as Hyumas Kalumi (Japanese Trade Mark the first group, No. 1,588,037), the aqueous extract will be referred to as Hyumaselurabin (Japanese Trade Mark the first group, No. 1,588,035) and granules will be referred to as Hyumas Guardran (Japanese Trade Mark the first group, No. 1,588,036).

The inventor of this application did his research work relative to the air treatment of vegetable humus with the objective of attaining compositions having more powerful sterilizing power, deodorizing and gas adsorbing properties and he filed an application, entitled a method for "activating vegetable humus," (Japanese patent application Sho 57-144615.)

The gist of this application will be summarized hereinafter. A term "activation of vegetable humus" is a collective expression pertaining deodorizing, gas adsorbing and enrichment of bacteriostatic action etc. The inventor of the present application noticed that in the activation of vegetable humus, the action of a microorganism particularly the action of aerobic microorganism plays a significant role together with the oxidation action due to oxygen in air, and found that as a condition for treatment, contact with air at a temperature and a humidity at which microorganism reaction is carried out smoothly, should be carried out as much as possible, and it is an important point of activation. A the decision to publish was made on August 10, Showa 62 (=1987) with regard to "a method for activating vegetable humus" (Japanese patent publication No. Sho 62-37003) which defines the condition for activating vegetable humus and was registered as patent No. 1,431,877 on March 24, 1988.

This is the meaning of the phrase "grinding vegetable humus and contacting sufficiently with air to effect activation" which is referred to here in after.

By the above-mentioned treatment, activated vegetable humus greatly improves its own gas adsorbing property, deodorizing power and bacteriostatic action, but at the same time unexpected effectivenesses has been discovered.

During the course of development of application fields for Hyumaselurabin, the inventor of the present application found that it has a property which improves the water raising (or suction) by cut flowers and has superior effectiveness for keeping flowers alive, and he filed an application for this preserving agent for cut-flowers (Japanese patent application, Sho 57-14776). Later, while the inventor of this application paid attention to the physiologically active effectiveness of Hyummaselurabin, he found that it has superior effectiveness as a foliar spraying agent and filed Japanese application No. Sho 62-313140. Further, by confirming that Hyumaselurabin has superior effectiveness also in taste improving, he filed an application entitled "Food processing assistant having taste-improving effect", Japanese patent application No. Sho 62-122053.

For the powdered body (Hyumas Kalumi), notable effectiveness has exhibited as a soil improving agent, in the cultivation of vegetables, fruits, etc. (Japanese patent application No. Sho 62-326900). In addition, in raising pigs and chickens, superior physiological active effectiveness of Hyumas Kalumi as a supplementary feed stuff has been found and a Japanese patent application No. Sho 63-10585, entitled "Assistant feed stuff" was filed.

Originally, activated vegetable humus deodorizing composition, and in pig farms and poultry farms etc. it has been used for deodorizing. Effectiveness as a supplementary feed stuff which brings about growth promotion, an increase in the resistance to sickness by pigs and chickens makes it clear that the physiologically active effect appears not only in the case of botany, but also in the case of animals.

I have now turned my attention to the fishing industry.

SUMMARY OF THE INVENTION (1) A method for transporting live fish comprising grinding vegetable humus containing 50–80% by weight of water, contacting this ground powder sufficiently with air to activate the ground powder, extracting the thus activated powder with water and removing solid matter by filtering to obtain an extract, mixing the said extract or the said activated powder in Oa water-tank containing live fish, and transporting said live-fish in the tank.

(2) In transporting live fish the activated powder or said extract is mixed in an amount of 0.5 to 4% by weight of extract or 0.1 to 0.4% of powder or granules of activated humus per weight of water in transportation tank.

DESCRIPTION OF THE PREFERRED EMBODIMENTS

In the marine products industry, it becomes necessary to transport marine products as a matter of course. If the transportation of marine products as a matter of course. If the transportation of marine products is carried out efficiently and economically, the marine product industry will show rapid development. Live fish transportation which enables people living in the cities far from the seaside to taste extremely fresh fishes or shells at their dining tables without refrigeration is now regarded as an important matter. However, the present status of live fish transportation is still in its infant stage, because physiology and pathology, as a matter of fundamental research are not yet sufficient and the transportation art is still in an undeveloped state. For example, in the case of sea bream, 16 hours is the limit for transportation time for land transportation. As to loading density, one ton of fish per 10 tons of water in a vessel (i.e. 10%) is regarded as the standard.

The decrease of soluble oxygen, increase of carbon dioxide, increase of suspended matters, rise of water temperature, etc. in a water vessel, all deteriorate the living environment of fish, even though, counter measures such as blowing of air or oxygen gas into water, and circulation, filtration, cooling of the water, etc. are taken. The problem of increase of ammonia, proliferation of microorganisms (bacteria), and the stress reaction of the fish are matters which need great care. As a measure for removing ammonia in water, treatment by way of zeolite or an ion exchange resin has been tried, but it cannot yet be said to be sufficient. The use of a chemical as a countermeasure of microorganism has been strictly restricted by law and, moreover, there is no satisfactory material.

The death of fish during the time of transportation of live fish includes herein, as is well known, the death of fish which are being transported, the death of fish just after transportation and the death of fish after lapse of 1 to 4 days, but these are all the result of stress on fish due to various kinds of stress reaction. It has been said that suppression of excitement of fish is one measure. Lowering of water temperature at the time of transportation, and the use of narcotic agent have been tried to lower the level of metabolism, etc., but none of them can be said to be a final edition.

When Hyumas Kalumi (powder) or Hyumas Guardran (granules) are put in a net bag, a cloth bag or a non-woven cloth bag and soaked in hot water of a bathtub, hot water does not become bad-smelling or impure even after bathing is done by many people. Even when Hyumaselurabin (aqueous extract) is used instead, a similar effect can be attained. Japanese patent application No. Sho 59-26962 (bathing agent) has already been filed, and this is an application in which superior deodorizing function and coagulation function of activated vegetable humus are utilized.

In the case of live fish transportation, it is an important point for the improvement of transportation efficiency to keep the water quality in a good state by removing dirty (soiled) things due to suspended matters. For removing suspended matters, filtration is effective. A circulation-filtration type water vessel has been used in many cases for live fish transportation. Since filtration efficiency depends upon the extent of coagulation of suspended matters, some effective coagulation treatment is preferable.

The inventor of the present application had the an idea of coagulation by way of Hyumaselurabin for the contamination of water quality due to suspended matters at the time of live fish transportation. Whether or not any concentration obstacle exists due to Hyumaselurabin relative to fish, was investigated.

For example, 1.6 L of Hyumaselurabin was added to 50 L of city water, while blowing air continuously therein by using an aerator and several goldfish and killifish were caused to swim therein. Both the goldfish and killifish were swimming around calmly and when baits were given they showed extraordinary appetites. The addition of Hyumaselurabin in an amount of about 3%, there was no harmful effect to the goldfish and killifish. The addition seemed to have a rather good influence.

Next, while blowing air continuously and similarly by an aerator into a water vessel containing 50 L of sea water and 0.8 L of Hyumaselurabin, several tens of small shrimps and several tens of gobies were introduced all were full of vigor, since even after the lapse of one week, none of them died. Two sea breams and one scorpionfish were caused to swim successively in the same water vessel. Both showed flourishing appetite to bait. The scorpionfish lived for 15 days, one sea bream lived 20 days and the other lived 60 days. The sea breams were bought from a fisherman and carried to the test space by spending 3 hours in a vessel containing sea water to which Hyumaselurabin had been admixed in a ratio 10% by weight. It is astonishing that such fish lived more than 20 days. The sea water was wholly replaced on the 15th day, but since then, there was no phenomenon which needs replacement was recognized and hence it was sufficient to supplement only evaporation loss. It is common that at 4 to 5 hours after the start of transportation a water vessel shows frothing in the live fish transportation of sea breams. The cause of the frothing is not known with certainty, but contamination of water by excrement, viscous liquid of fishes, etc. and the growth of microorganisms can be considered as factors and it is certain that these have an influence upon the life of live fish transportation. Such frothing is an index contamination of water quality. By considering that frothing might be suppressed if water quality can be maintained in a good state by using Hyumaselurabin, the following experiment was conducted.

Two water vessels (A) and (B) having circulation-filtration system were prepared and the same number of sea-breams having similar bodies were introduced (the weight of the fish bodies was 20% relative to water amount) in one water vessel (A), to which Hyumaselurabin was added in an amount of 2% of the water amount and by using a commercially available aerator air was continuously blown therein.

For the purpose of comparison a water vessel (B) to which no Hyumaselurabin was added started to form froth and the water contamination became conspicuous, but in the water vessel (A) there was no apparent change. The fish in the water vessel(B) initially were in an excited state, but gradually lost vigor, and died on the 4th day.

In contrast, the water vessel (A) hardly showed contamination, or frothing, and all the fishes were alive. As the cause of this effectiveness, it is considered that Hyumaselurabin caught ammonia well, and further due to its strong bacteriostatic action, the accumulation of free ammonia in the vessel (A) was suppressed and the growth of microorganism was prevented.

Further, it is confirmed that Hyumaselurabin contains adequate amounts of minerals such as sodium, potassium, calcium, magnesium, aluminum, iron, etc. and in addition it is confirmed that various kinds of amino acids as well as the existence of several kinds of vitamins, and it is believed that there are various kinds of components probably derived from microorganisms are contained though not yet confirmed. It is thought that the collective effect of these components have a beneficial physiologically active effect on fish, exerting action which enables them to endure stress and decrease excitement.

Another experiment, was carried out with 50 L sea water, 15 kg (30%) sea breams, and 1.5 L (3%) Hyumaselurabin. It was found that after 10 days all the sea breams were alive, and even at 30% density, the transportation of live fishes was possible.

Suppressing of accumulation of free ammonia, prevention of growth of microorganisms, properly coagulating dirty materials and filtering them to keep the quality of water in good condition, are all considered to be the effect of Hyumaselurabin.

The amount of the added Hyumaselurabin is preferably about from 0.5% to 4%. It does depend very much upon the kind of fish or size of the fish, but if the density of the fish is increased, it is preferable to also increase the amount of added Hyumaselurabin to some extent.

Further, since Hyumaselurabin is tasteless and odourless, it is drinkable by itself and there is no danger of toxicity at all. Besides Hyumaselurabin, even Hyumas Kalumi (powder) or Hyumas Guardran (granule), when it is enclosed in a net bag and soaked in water, can have the same extent of effectiveness as the addition of Hyumaselurabin by allowing effective component to be dissolved out into water.

The standard amount of use is from 0.1 to 0.4% relative to the water amount. Besides soaking the net bags in a water vessel, fixing them to a circulation-filtration apparatus in order to let them serve also as filtration assistant is another way of use.

EXAMPLE 1

In two sets (A and B) of circulation-filtration type water vessel having 50 L capacity, 50 L of sea water was put in each of the vessels, 10 sea breams having similar body size (total fish weight is 10 kg, 20% relative to the water amount) were introduced. To the water vessel (A), 1 L (2% relative to the water amount) of Hyumaselurabin was added and to the vessel (B) 1 L of city water was added and used as a comparative vessel. By using an aerator, air was continuously blown into the vessel. By using circulating pumps, the sea water in the water vessels was circulated and filtered. The control of the water temperature was not conducted and it was allowed to depend on room temperature (15 - 20° C.). The stopping of bait was conducted for two days and bait was not given during the experimental time. In the comparative vessel (B) frothing appeared after about 20 hours and the contamination of water became marked after about 45 hours. However, the experimental water vessel (A) did not show any recognizable change. The fishes in the water vessel (B) tended to be in an excited state in the beginning, were not calm and gradually became depressed after about 60th hours, the one after the other died and on the 75th hour the last fish died. On the other hand, in vessel A almost no contamination was recognized even after the elapse of 10 days (240 hours). There was no frothing at all. The fishes were all vigorously alive. There were no dead fish.

EXAMPLE 2

Into a circulation and filtration type water vessel containing a capacity of 50 L sea water, were put 15 sea breams (total weight 15 kg and 30% relative to water amount).

Hyumas Guardran (granule) in an amount of 100 g was enclosed in a net bag (from which the granule does not leak but water can pass through freely) was soaked in that water vessel. Separately, 1 L of Hyumaselurabin was added.

According to the same procedure as in Example 1, an experiment was conducted, but even after the elapse of 10 days (240 hours) almost no muddiness was recognized, and there was no frothing. The fishes looked cramped, bumping into each other, but they were gentle and calm down. There was not even one dead fish during the time of the experiment as well as after completion of the experiment.

What is claimed is:

1. A method for transporting live fish comprising grinding vegetable humus containing from 50 to 80% by weight of water, forming a ground powder contacting the said ground powder sufficiently with air to activate said ground powder, extracting the said activated powder with water and removing solid matter by filtering to obtain an extract, mixing the said activated powder or said extract in water of water-tank containing live fish and transporting said live fish containing tank.

2. A method for transporting live fish according to claim 1 in which said activated powder or said extract is mixed in an amount of from 0.5 to 4% by weight of extract or from 0.1 to 0.4% by weight of powder or granules of activated humus per weight of water in said live fish containing tank.

* * * * *